(12) United States Patent
Venschott

(10) Patent No.: US 11,364,765 B2
(45) Date of Patent: Jun. 21, 2022

(54) AIR-CONDITIONING DEVICE

(71) Applicant: TRUMA GERÄTETECHNIK GMBH & CO. KG, Putzbrunn (DE)

(72) Inventor: Matthias Venschott, Putzbrunn (DE)

(73) Assignee: TRUMA GERÄTETECHNIK GMBH & CO. KG, Putzbrunn (DE)

( * ) Notice: Subject to any disclaimer, the term of this patent is extended or adjusted under 35 U.S.C. 154(b) by 0 days.

(21) Appl. No.: 17/256,847

(22) PCT Filed: Apr. 29, 2019

(86) PCT No.: PCT/EP2019/060866
§ 371 (c)(1),
(2) Date: Dec. 29, 2020

(87) PCT Pub. No.: WO2020/007518
PCT Pub. Date: Jan. 9, 2020

(65) Prior Publication Data
US 2021/0138869 A1 May 13, 2021

(30) Foreign Application Priority Data
Jul. 6, 2018 (DE) ...................... 10 2018 005 338.6

(51) Int. Cl.
*B60H 1/00* (2006.01)
*F24F 13/30* (2006.01)

(52) U.S. Cl.
CPC ......... *B60H 1/00364* (2013.01); *F24F 13/30* (2013.01); *B60H 2001/00235* (2013.01)

(58) Field of Classification Search
CPC ............ B60H 1/00364; B60H 1/00371; B60H 2001/00235; F24F 1/16; F24F 13/30
See application file for complete search history.

(56) References Cited

U.S. PATENT DOCUMENTS 2,182,569 A * 12/1939 Peo ...................... B60H 1/3229
62/426
4,592,207 A * 6/1986 Rummel ............ B60H 1/00371
62/244

(Continued)

FOREIGN PATENT DOCUMENTS

CN 101291821 A 10/2008
CN 102700702 A 10/2012

(Continued)

*Primary Examiner* — Eric S Ruppert
*Assistant Examiner* — Hans R Weiland
(74) *Attorney, Agent, or Firm* — McNees Wallace & Nurick LLC

(57) ABSTRACT

An air-conditioning unit for installation on a roof is disclosed. The air-conditioning unit includes a plurality of functional components arranged in a housing which has an attachment side for installation, and two support arms which support at least one functional component such that the at least one functional component is arranged higher with respect to the attachment side than other functional components. The two support arms laterally encompass the at least one functional component so that each support arm supports a different side of the at least one functional component, in that the two support arms each support the at least one functional component in an area of a face side, in that the two support arms each have the shape of a "S", and in that each support arm has two face side portions which are positioned at different heights, and a portion connecting the two face side portions.

6 Claims, 4 Drawing Sheets

(56) References Cited

U.S. PATENT DOCUMENTS

| | | | |
|---|---|---|---|
| 4,622,831 A * | 11/1986 | Grupa | B60H 1/00371 62/244 |
| 4,748,827 A | 6/1988 | Chang | |
| 4,905,478 A * | 3/1990 | Matsuda | B60H 1/3204 62/428 |
| 5,005,372 A * | 4/1991 | King | B60H 1/00371 62/244 |
| 6,019,162 A | 2/2000 | Saida et al. | |
| 9,242,528 B2 | 1/2016 | Graaf et al. | |
| 10,562,370 B2 | 2/2020 | Lee et al. | |
| 10,611,207 B2 | 4/2020 | Ryu et al. | |
| 10,675,942 B2 | 6/2020 | Hipp-Kalthoff et al. | |
| 11,052,726 B2 | 7/2021 | Ryu et al. | |
| 2008/0314072 A1 | 12/2008 | Plank et al. | |
| 2010/0147000 A1 * | 6/2010 | Swartz | B60H 1/00571 29/525.01 |
| 2014/0075973 A1 | 3/2014 | Graaf et al. | |
| 2015/0053371 A1 * | 2/2015 | Fisher | B60H 1/3227 165/41 |
| 2015/0292790 A1 * | 10/2015 | Mastroianni | F24F 13/30 62/285 |
| 2016/0303941 A1 | 10/2016 | Kinmartin et al. | |
| 2017/0190236 A1 | 7/2017 | Lee et al. | |
| 2017/0203631 A1 | 7/2017 | Ryu et al. | |
| 2018/0015809 A1 * | 1/2018 | Stewart | B60H 1/00371 |
| 2018/0105012 A1 | 4/2018 | Oda et al. | |
| 2018/0147911 A1 | 5/2018 | Woo et al. | |
| 2018/0264912 A1 | 9/2018 | Hipp-Kalthoff et al. | |
| 2018/0361824 A1 | 12/2018 | Ryu et al. | |

FOREIGN PATENT DOCUMENTS

| | | |
|---|---|---|
| CN | 203258764 U | 10/2013 |
| CN | 103673401 A | 3/2014 |
| CN | 204141877 U | 2/2015 |
| CN | 204478287 U | 7/2015 |
| CN | 205536218 U | 8/2016 |
| CN | 105980178 A | 9/2016 |
| CN | 106976375 A | 7/2017 |
| CN | 206781475 U | 12/2017 |
| CN | 107531126 A | 1/2018 |
| CN | 107635803 A | 1/2018 |
| CN | 107848372 A | 3/2018 |
| DE | 4440044 A1 | 5/1996 |
| DE | 102004033352 A1 | 1/2006 |
| DE | 102004032920 A1 | 3/2006 |
| DE | 102006009735 A1 | 9/2006 |
| DE | 102007019078 A1 | 9/2008 |
| EP | 1681191 A2 | 7/2006 |
| EP | 2299194 A2 | 3/2011 |
| EP | 2792964 A2 | 10/2014 |
| JP | H 11147416 A | 6/1999 |
| JP | 2010070082 A | 4/2010 |
| WO | 2006021226 A1 | 3/2006 |
| WO | 2007042065 A1 | 4/2007 |

* cited by examiner

AIR-CONDITIONING DEVICE

The present invention relates to an air-conditioning device or unit. In this context, the air-conditioning unit is configured for installation on a roof. The air-conditioning unit includes a plurality of functional components. The functional components of the plurality of functional components are arranged in a housing. The housing has an attachment side for installation on the roof. The air-conditioning unit includes two support arms. The two support arms support the at least one functional component of the plurality of functional components such that the at least one functional component is arranged higher with respect to the attachment side than other functional components that are also among the plurality of functional components. The roof is, e.g., part of a vehicle or of a boat or, generally, of a room or space that is to be e.g. cooled by the air-conditioning unit. The roof may therefore also generally be a ceiling of a room.

An air-conditioning unit (an alternative designation is air-conditioning system) is used, for example, to cool the interiors of caravans or boats. In this case, the required functional components are located in a surrounding housing that is fastened on a roof by an attachment side. Below the roof, for example, is the room that is to be cooled by the air-conditioning system.

The principle of refrigeration by means of a cooling circuit, on which air cooling is based, has been known for a long time and is described, for example, in WO 2007/042065 A1. The housing has a holding fixture made of a foamed plastic material having a complex structure. WO 2006/021226 A1 shows an air-conditioning unit in which the condenser is arranged in an elevated position on a base plate. DE 10 2006 009 735 A1 shows an air-conditioning system with a heat exchanger arranged in an elevated position.

Nowadays, products are often manufactured and distributed not only in one country, but worldwide. On the one hand, due to the respective standards, specifications, needs or requirements, such products have to be adapted for the market in question. On the other hand, it may also turn out that the production itself cannot be carried out at the same level everywhere.

The aim is therefore to design products to be modular as far as possible. Furthermore, it is advantageous to reduce the products to an always consistent core with elements that are to be adapted to the market involved. It is also advantageous here if the structure is made up of as simple components or elements as possible, which will increase the probability that they will be identical or simple to manufacture in any country.

Air-conditioning systems are such complex products, which have to be adapted to the respective markets owing to standards and consumer preferences. For example, consider the different specifications for the refrigerant to be used in a particular case. In addition, the interaction of so many and so different components also shows that it is not without effort to meet the same high demands on optimum production in different regions.

The object of the invention is therefore to propose an air-conditioning system which is as simple as possible to manufacture and which also allows easy adaptation to different manufacturing conditions. The air-conditioning system according to the invention is thus also in particular intended to involve an alternative to the prior art.

The invention achieves the object in that the two support arms laterally encompass the at least one functional component so that each support arm supports a different side of the at least one functional component, in that the two support arms each support the at least one functional component in the area of a face side, and in that the two support arms each have the shape of a capital letter "S" in that each support arm has two face side portions which are positioned at different heights, and one portion connecting these two portions. Owing to the two support arms, the at least one functional component is located higher than other functional components (as viewed) from the attachment side (or arranged relative thereto). The two sides of the functional component, each of which is held by a support arm, are in particular two opposite sides of the functional component. In one configuration, the two face side end portions of the two support arms, each of which supports the at least one functional component, extend essentially at an identical level so that a flat area is obtained between the two support arms at this upper face side, the flat area being spanned by the two support arms for the functional component arranged at a higher level. The shape of the capital letter "S" of the support arms can be rounded or free of rounded portions or extend in a mixed form here. In one configuration, the capital letter "S" is similar to the capital letter "Z", but without the middle crossbar. The capital letter "S" may also be mirrored.

In one configuration, one functional component is arranged to be higher than all other functional components. In an alternative configuration, the at least one functional component is arranged to be higher than some of the plurality of the functional components.

The functional components of the air-conditioning system are, for example, a condenser, a compressor, an expansion device, an evaporator, a refrigerant reservoir (e.g. a tank) or an electronic unit to control the other functional components. Further functional components include, for example, a fan, e.g. a fan assigned to the condenser or to the evaporator.

In one configuration, the elevated positioning and the associated internal structure of the air-conditioning system results in particular in a hollow area with respect to the roof below the functional component, through which, in one configuration, air flows freely.

Positioning part of the air-conditioning system at a higher level also results in the advantage that the bearing surface of the air-conditioning system on the roof for installation is reduced.

The two support arms thus contribute to simplifying the structure of the air-conditioning system and making it sufficient to use components of reduced complexity.

In one configuration, the at least one functional component is firmly connected to the two support arms, e.g. by screws, bolts or by adhesive processes.

According to one configuration, the two support arms are made to be mirror-symmetrical to each other. The two support arms are thus in principle designed identically, but are made to be mirrored relative to each other. This configuration is relevant, for example, if the two support arms laterally encompass the at least one functional component or, in one configuration, even constitute the lateral support structures along a longitudinal extent of the air-conditioning system.

One configuration consists in that at least one support arm of the two support arms has a C-profile. A C-profile is a relatively simple structure, which therefore does not make high demands on the initial workpieces or, if applicable, semi-finished products. As a rule, the C-profile is also a mechanically stable shape. If the two support arms are configured to be mirror-symmetrical, in one configuration the C-profiles of the two support arms each open inwards and thus towards the functional component arranged at a higher level.

One configuration provides that the at least one functional component is partly arranged in an area encompassed by the C-profile. In this configuration, the functional component rests partly in the area defined by the "C" of the C-profile. If both support arms are constructed with a C-profile and the two support arms encompass the functional component at the sides, in one configuration two lateral portions of the functional component are each positioned in the areas encompassed by the C-profiles.

One configuration consists in that the two support arms are contacted with each other on the face sides by means of a terminating element. In one configuration, the terminating element functions as a type of cap for the face sides of the two support arms. In addition, in one configuration an increased stability is also obtained.

In one configuration, one support arm is made integrally or in one piece. In one variant, the two support arms are one-piece steel components.

An alternative configuration provides that at least one support arm of the at least two support arms is of a multi-part configuration and includes at least two subcomponents. In this configuration, a support arm is made up of a plurality of parts or individual pieces, which are suitably designed and connected to each other. Proceeding therefrom, the structure or shape of the support arm can also be broken down into substructures, which are thus correspondingly simpler in design and therefore easier to manufacture.

One configuration consists in that one subcomponent forms a face side of the support arm, which supports the at least one functional component (which is thus positioned higher). In this configuration, in particular the face side of a support arm is a subcomponent. Therefore, it is for example possible to provide a respective suitable subcomponent of the support arms for, e.g., functional components (to be arranged higher) that are dimensioned differently (so as to match the respective standards) and to connect it to the remaining subcomponents of the support arms (which preferably remain the same throughout the variants). Therefore, at least one subcomponent of the support arms that always remains the same can still be made use of for different functional components as well.

One configuration makes provision that one subcomponent forms a face side of the support arm, which supports functional components of the plurality of functional components relative to which the at least one functional component is arranged higher. In this configuration, one subcomponent forms the (thus lower) face side, which supports the functional components arranged at a lower level. Thus, in relation to the configuration mentioned above, this is, as it were, the reverse configuration.

One configuration consists in that at least one support arm of the at least two support arms is of a multi-part configuration and includes three subcomponents, in that a first subcomponent forms a face side of the support arm, which supports the at least one functional component, in that a second subcomponent forms another face side of the support arm, which supports functional components of the plurality of functional components relative to which the at least one functional component is arranged higher, and in that a third subcomponent serves for a connection between the first subcomponent and the second subcomponent.

In this configuration, a support arm consists of three subcomponents forming the two face sides and a middle piece between the face portions. The middle piece (that is, the third subcomponent) preferably brings about the difference in height between the one functional component that is arranged at a higher position and the other functional components that are arranged at lower positions. Since the other two subcomponents (first and second subcomponents) each support the functional components and are therefore dependent on the respective shapes and configurations thereof, in one variant embodiment these two subcomponents (i.e. the first and second subcomponents) each have to be suitably selected and the shape of the middle piece (i.e. the third subcomponent) is maintained. This allows to accommodate different design variants or specific requirements made by different countries while retaining a uniform basic shape.

One configuration provides that subcomponents out of the at least two or three subcomponents consist of different materials. The different materials in particular also involve different manufacturing methods. In this configuration, at least one support arm (preferably both support arms) thus consists of different materials that are each associated with the subcomponents.

One configuration consists in that the air-conditioning unit includes an insulation component, and the insulation component encompasses, in a thermally insulating manner, some functional components of the plurality of functional components in relation to which the at least one functional component is arranged higher. In this configuration, the functional components that are located at the lower level are introduced into an insulation component such as, e.g., a type of box made from a plastic material.

One configuration provides that the air-conditioning unit includes an encompassing component and that the encompassing component forms at least the outer sides of the air-conditioning unit that differ from the attachment side of the air-conditioning unit.

One configuration consists in that the encompassing component is a thermoformed housing made from a plastic material.

The encompassing component gives the air-conditioning system its actual appearance and constitutes the external closure. Therefore, the encompassing enclosure component may, for example, be made from a plastic material that also allows a design with an appropriate color or haptics or weather-resistance.

One configuration provides that a fan is arranged in the encompassing component. In one configuration, the fan is located above the functional component that is arranged above the other functional components. In one configuration, the functional component that has the fan assigned to it is a condenser, so that a condenser fan is involved.

One configuration consists in that the air-conditioning unit includes an air distributor, and that the air distributor is configured to be connectable to the support arms, directly or indirectly, depending on the configuration. For this configuration, for example, an aperture is produced in the roof during assembly, so that the air distributor can be connected below, and the other components, thus also including the support arms and the functional components, can be interconnected above the roof.

According to one configuration, provision is made that the two support arms support exactly one functional component such that the exactly one functional component is arranged higher with respect to the attachment side than the other functional components. In this configuration, therefore, the two support arms explicitly only hold one functional component in an elevated position as compared to the other functional components. The above-mentioned fan assigned to the condenser would be a functional component here which is not among those functional components that are arranged at a lower level than the elevated functional component (preferably the condenser in the exemplary embodiment). This means that this particular functional component is not arranged at a higher level than all other functional components, but only higher than some. The functional components located at a lower level are, for example, those with a higher weight.

One configuration provides that the at least one (or, in one configuration, the only) functional component that is supported by the two support arms is a condenser.

One configuration consists in that the functional components of the plurality of functional components in relation to which the at least one functional component is arranged at a higher level comprise a compressor, an expansion device, an evaporator and/or a refrigerant reservoir.

One configuration provides that at least one support arm consists at least partly of an extruded part. In one configuration, the two support arms each are, or consist at least partly of, extruded parts.

In detail, there is a multitude of possibilities to configure and further develop the air-conditioning unit according to the invention. In this respect, reference is made, on the one hand, to the claims dependent on claim 1 and, on the other hand, to the following description of exemplary embodiments in conjunction with the drawings, in which:

Figure 1:
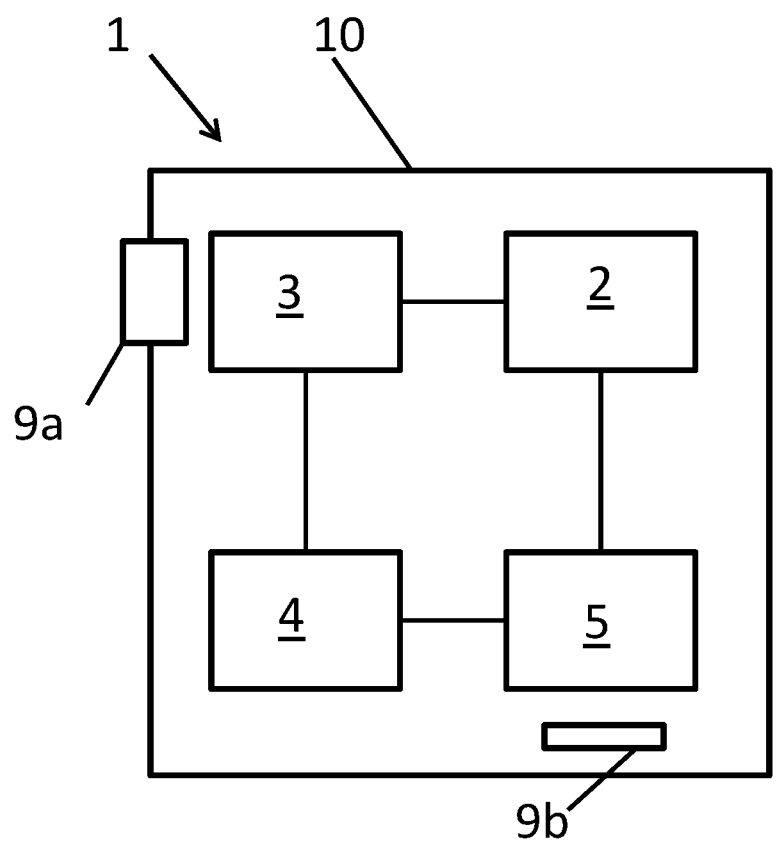
FIG. 1 shows a schematic representation of an air-conditioning unit.

FIG. 1 schematically shows the structure of an air-conditioning system 1 for cooling a room or space, e.g. the interior of a vehicle. The cooling circuit or refrigeration process realized therewith is described, for example, in WO 2007/042065 A1.

For the refrigeration process, a compressor 2 compresses a gaseous refrigerant, which thereby absorbs heat and is transported to a condenser 3 via a refrigerant line. The condenser 3 serves as a heat exchanger in that the heat of the refrigerant is transferred to the cooler ambient air. The ambient air is drawn in through a condenser fan 9a here and is blown out again after interaction with the refrigerant. The compressed refrigerant will condense as a result of the heat release.

The liquid refrigerant, which continues to be under high pressure, is expanded to a lower pressure in an expansion means 4, which is in the form of a throttle, for example. The refrigerant cools down in the process.

In the next step, the refrigerant reaches an evaporator 5, through which the air of the room to be cooled—that is, e.g., the interior of a caravan or a recreational vehicle—is guided by means of an evaporator fan 9b. In the process, the air transfers its heat to the refrigerant, which transitions to the gaseous state. The gaseous refrigerant finally returns to the compressor 2 so that the cooling circuit can be continued.

The circuit can also be reversed so that the unit 1 serves as a space heater.

The components described are exemplary functional components of the air-conditioning system 1 and are located partly in the interior or partly in the wall of a housing 10.

Figure 2:
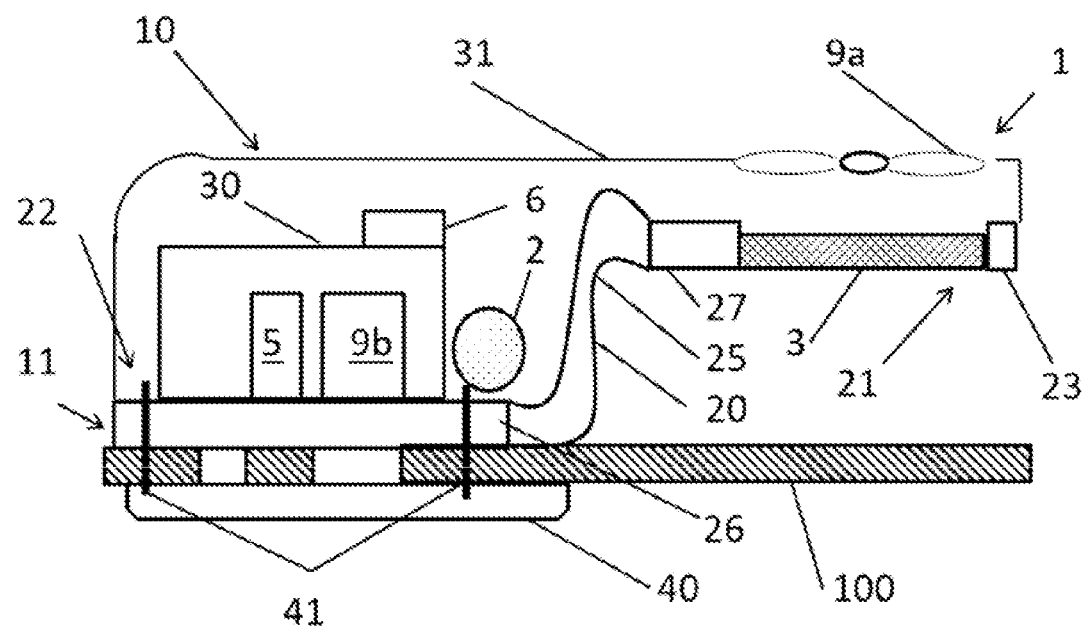
FIG. 2 shows a section taken through a schematically represented air-conditioning unit.

FIG. 2 schematically shows the basic appearance of the air-conditioning system 1. The air-conditioning system 1 here is mounted on a roof 100 and extends through recesses in this roof 100 to an air distributor 40 in the interior which is to be cooled by the air-conditioning system 1. If the roof 100 is part of a vehicle, the air-conditioning system 1 is fixed to the roof 100 in the direction of travel. The cavity between the air-conditioning system 1 and the roof 100 is therefore located, in the direction of travel, behind the area of the air-conditioning system 1 that rests on the roof 100.

The "S" shape—mirrored here—of the support arm 20 can be seen.

The support arm 20 is configured in three parts here and has two subcomponents 26, 27, which constitute the face sides 21, 22, and a middle subcomponent 25, which causes the difference in height between the other two subcomponents 26, 27. The upper subcomponent 27 and the lower subcomponent 26 have a flat configuration so that they are components that are correspondingly simple to manufacture. Only the middle subcomponent 25 has the actual S-shape here.

The upper, or first, subcomponent 27, which faces a first face side 21, supports and thus elevates the functional component, which in this case is the condenser 3. Below the condenser 3 there is a cavity relative to the roof 100, the cavity being freely accessible to air here. Above the condenser 3, a fan 9a (i.e. a condenser fan) assigned to the condenser is arranged. The end side of the support arm 20 and thus the free end of the first subcomponent 27 is closed by a terminating element 23, which also contacts the other support arm, which is not shown here (cf. FIG. 4).

The second, or lower, subcomponent 26 is located toward the second face side 22. This subcomponent 26 carries the other functional components. Here, the evaporator 5 and the evaporator fan 9b are located in the insulation component 30. It can also be seen that the room air is taken in through a recess and, cooled by the evaporator fan 9b, is fed back into the room through another recess in the roof 100. Outside the insulation component 30, which provides thermal insulation, there are the compressor 2 and, here by way of example, a refrigerant reservoir 6. Since the compressor 2 heats up, it is thermally separated from the evaporator 5 by the insulation component 30.

The room air to be cooled is thus also passed through the insulation component 30.

In the illustrated configuration, the functional components are located on the lower subcomponent 26, but they may also be located in between, that is, between the two support arms 20. The functional components are accommodated here in an insulation component 30, which provides thermal insulation.

In an alternative configuration (not illustrated), the support arms 20 are made in one piece and are preferably extruded parts made of a steel.

The air-conditioning system 1 is connected to the roof 100 via the attachment side 11, the lower face side 22 of the support arms 20 thus also providing mechanical attachment and stability. The fixing is indicated here by two screw- or bolt-like fastening elements 41.

The other sides of the air-conditioning system 1 are formed by an encompassing component 31, which is for example a thermoformed housing made from a plastic material. This encompassing component 31 does not fulfil a holding function, but essentially only serves to protect the components proper of the air-conditioning system 1 from the environment. In the configuration shown, the encompassing component 31 in particular is also provided with a recess in which the condenser fan 9a is inserted.

In the configuration illustrated here, the encompassing component 31 (an alternative designation would be encompassing housing) ends at the level of the lower edge of the support arms 20 in the direction of the attachment side 11 or the roof 100.

Figure 3:
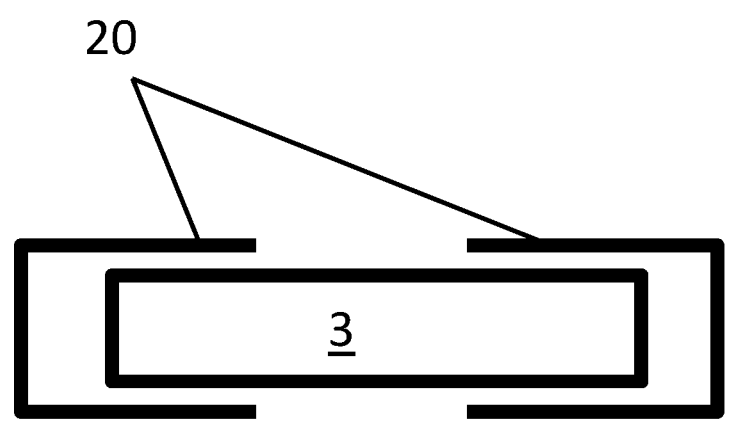
FIG. 3 shows a different section taken through a part of a front area of the air-conditioning unit of FIG. 2.

The sectional view of FIG. 3 shows that the two support arms 20 each have a C-profile and that the functional component 3 rests on the areas that are encompassed by the C-profiles and are preferably also fixed there.

Figure 4:
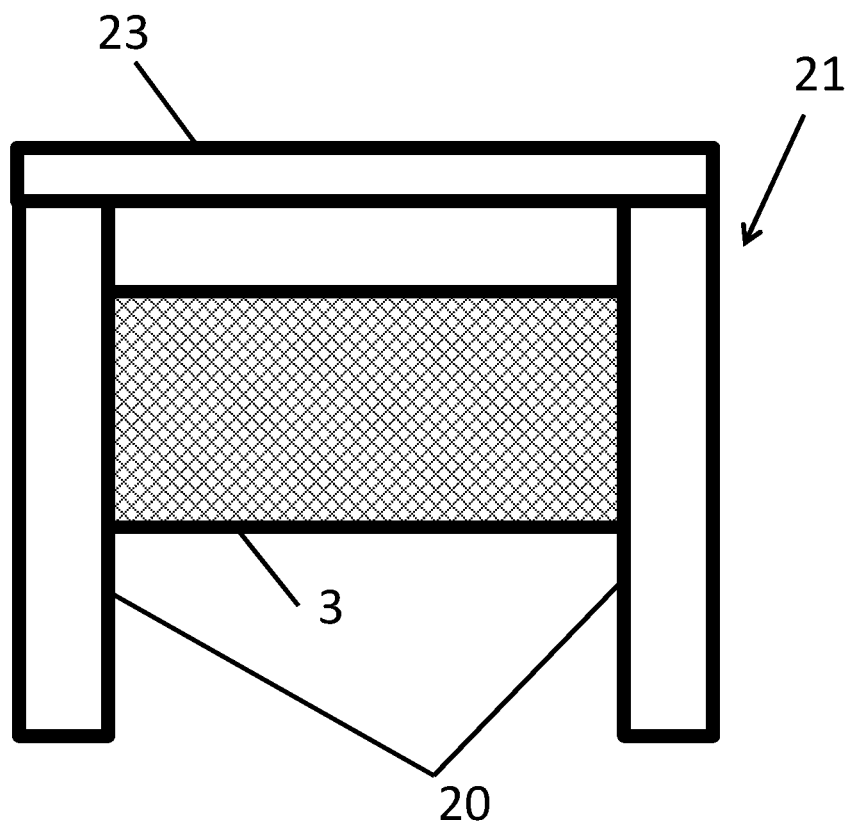
FIG. 4 shows a top view of a part of the front area of the air-conditioning unit of FIG. 2 and FIG. 3.

FIG. 4 shows the face side 21, which comprises the upper part of the capital letter "S" of the support arms 20 (cf. FIG. 2).

The functional component 3 rests laterally in the support arms 20, as shown, e.g., in FIG. 3. The two end portions of the functional components 3 are further connected with each other by means of a terminating element 23. In one configuration, the terminating element 23 here is located in the open ends of the C-profiles of the support arms 20, similar to a plug.

LIST OF REFERENCE NUMBERS 1 air-conditioning unit
2 compressor
3 condenser
4 expansion device
5 evaporator
6 refrigerant reservoir
9a condenser fan
9b evaporator fan
10 housing
11 attachment side
20 support arm
21 face side
22 face side
23 terminating element
25 subcomponent
26 subcomponent
27 subcomponent
30 insulation component
31 encompassing component
40 air distributor
41 fastening element
100 roof

The invention claimed is:

1. An air-conditioning unit for installation on a roof, comprising:
   a plurality of functional components, the plurality of functional components being arranged in a housing, the housing having an attachment side for installation on the roof; and
   two support arms, the two support arms supporting at least one functional component of the plurality of functional components such that the at least one functional component is arranged higher with respect to the attachment side than other functional components of the plurality of functional components, wherein:
      the two support arms laterally encompass the at least one functional component so that each support arm supports a different side of the at least one functional component,
      the two support arms each support the at least one functional component in an area of a face side,
      the two support arms each have a shape of a "S" and has two face side portions which are positioned at different heights, and a portion connecting the two face side portions,
      the two support arms are configured to be mirror-symmetrical,
      the two support arms each have a C-profile,
      the C-profiles of the two support arms each open inwards toward the at least one functional component,
      the at least one functional component is partly arranged in areas encompassed by the C-profiles,
      upper sections of the two support arms run parallel along a longitudinal extent of the at least one functional component and lower sections of the support arms run in extension to the longitudinal extent of the at least one functional component,
      the at least one functional component that is supported by the two support arms is a condenser, and
      the other functional components of the plurality of functional components in relation to which the at least one functional component is arranged higher includes a compressor, an expansion device, and an evaporator.

2. The air-conditioning unit according to claim 1,
wherein the two support arms are contacted with each other on the face sides by a terminating element,
wherein at least one support arm of the two support arms is of a multi-part configuration and includes three subcomponents,
wherein a first subcomponent forms a face side of the at least one support arm, which supports the at least one functional component,
wherein a second subcomponent forms another face side of the at least one support arm, which supports the other functional components of the plurality of functional components, relative to which the at least one functional component is arranged higher, and
wherein a third subcomponent serves for a connection between the first subcomponent and the second subcomponent.

3. The air-conditioning unit according to claim 2,
wherein subcomponents of the three subcomponents consist of different materials.

4. The air-conditioning unit according to claim 1, further comprising:
   an insulation component,
   wherein the insulation component encompasses some functional components of the plurality of functional components in a thermally insulating manner, relative to which the at least one functional component is arranged higher, and
   an encompassing component,
   wherein the encompassing component forms at least outer sides of the air-conditioning unit that differ from the attachment side of the air-conditioning unit, and
   wherein a condenser fan is arranged in the encompassing component above the at least one functional component that is supported by the two support arms.

5. The air-conditioning unit according to claim 4,
wherein the encompassing component is a thermoformed housing made from a plastic material.

6. The air-conditioning unit according to claim 1,
wherein at least one support arm consists at least partly of an extruded part.

* * * * *

UNITED STATES PATENT AND TRADEMARK OFFICE
CERTIFICATE OF CORRECTION

| | | |
|---|---|---|
| PATENT NO. | : 11,364,765 B2 | Page 1 of 1 |
| APPLICATION NO. | : 17/256847 | |
| DATED | : June 21, 2022 | |
| INVENTOR(S) | : Mathias Venschott | |

It is certified that error appears in the above-identified patent and that said Letters Patent is hereby corrected as shown below:

On the Title Page

Item (72) should read:
Mathias Venschott, Putzbrunn (DE)

Signed and Sealed this
Fifteenth Day of November, 2022

Katherine Kelly Vidal
*Director of the United States Patent and Trademark Office*